United States Patent
Desmedt et al.

(10) Patent No.: US 9,663,365 B2
(45) Date of Patent: May 30, 2017

(54) METHOD FOR THE DIRECT SYNTHESIS OF HYDROGEN PEROXIDE

(71) Applicant: SOLVAY SA, Brussels (BE)

(72) Inventors: Frédérique Desmedt, Brussels (BE); Yves Vlasselaer, Leefdaal (BE); Pierre Miquel, Roubaix (FR)

(73) Assignee: Solvay SA, Brussels (BE)

(*) Notice: Subject to any disclaimer, the term of this patent is extended or adjusted under 35 U.S.C. 154(b) by 71 days.

(21) Appl. No.: 14/440,648

(22) PCT Filed: Oct. 22, 2013

(86) PCT No.: PCT/EP2013/072020
§ 371 (c)(1),
(2) Date: May 5, 2015

(87) PCT Pub. No.: WO2014/072169
PCT Pub. Date: May 15, 2014

(65) Prior Publication Data
US 2015/0336796 A1    Nov. 26, 2015

(30) Foreign Application Priority Data
Nov. 6, 2012 (EP) .................................. 12191401

(51) Int. Cl.
*B01J 27/053* (2006.01)
*B01J 35/00* (2006.01)
(Continued)

(52) U.S. Cl.
CPC ............. *C01B 15/029* (2013.01); *B01J 23/44* (2013.01); *B01J 23/58* (2013.01); *B01J 27/053* (2013.01);
(Continued)

(58) Field of Classification Search
None
See application file for complete search history.

(56) References Cited

U.S. PATENT DOCUMENTS

| | | |
|---|---|---|
| 4,975,256 A | 12/1990 | Hegedus et al. |
| 5,447,706 A | 9/1995 | Van Weynbergh et al. |

(Continued)

FOREIGN PATENT DOCUMENTS

| | | |
|---|---|---|
| CN | 1817838 A | 8/2006 |
| EP | 0303495 A1 | 2/1989 |

(Continued)

OTHER PUBLICATIONS

Burch, R., et al—"An investigation of alternative catalytic approaches for the direct synthesis of hydrogen peroxide from hydrogen and oxygen", 2003, Applied Catalysis B: Environmental, vol. 42, pp. 203-211; 9 pgs.

(Continued)

*Primary Examiner* — Colin W Slifka
(74) *Attorney, Agent, or Firm* — Osha Liang LLP

(57) ABSTRACT

The present invention relates to a method for the direct synthesis of hydrogen peroxide using a catalyst comprising at least one catalytically active metal selected from elements in Groups 7 to 11, wherein the catalytically active metal is supported on a carrier comprising at least one compound selected from the group consisting of sulfates and phosphates of alkaline-earth metals, wherein said compound is precipitated on the carrier.

14 Claims, 1 Drawing Sheet

(51) Int. Cl.
*B01J 37/03* (2006.01)
*C01B 15/029* (2006.01)
*B01J 37/18* (2006.01)
*B01J 23/44* (2006.01)
*B01J 23/58* (2006.01)
*B01J 35/10* (2006.01)

(52) U.S. Cl.
CPC ....... *B01J 35/0006* (2013.01); *B01J 35/1009* (2013.01); *B01J 35/1019* (2013.01); *B01J 37/035* (2013.01); *B01J 37/18* (2013.01)

(56) References Cited

U.S. PATENT DOCUMENTS

2002/0028164 A1  3/2002  Schutte et al.
2012/0165185 A1  6/2012  Gramiccioni et al.

FOREIGN PATENT DOCUMENTS

EP    0878610 A1   11/1998
GB     776991 A    6/1957

OTHER PUBLICATIONS

Edwards, Jennifer K., et al—"Au-Pd supported nanocrystals as catalysts for the direct synthesis of hydrogen peroxide from H2 and O2", 2008, Green Chem., vol. 10, pp. 388-394; 7 pgs.

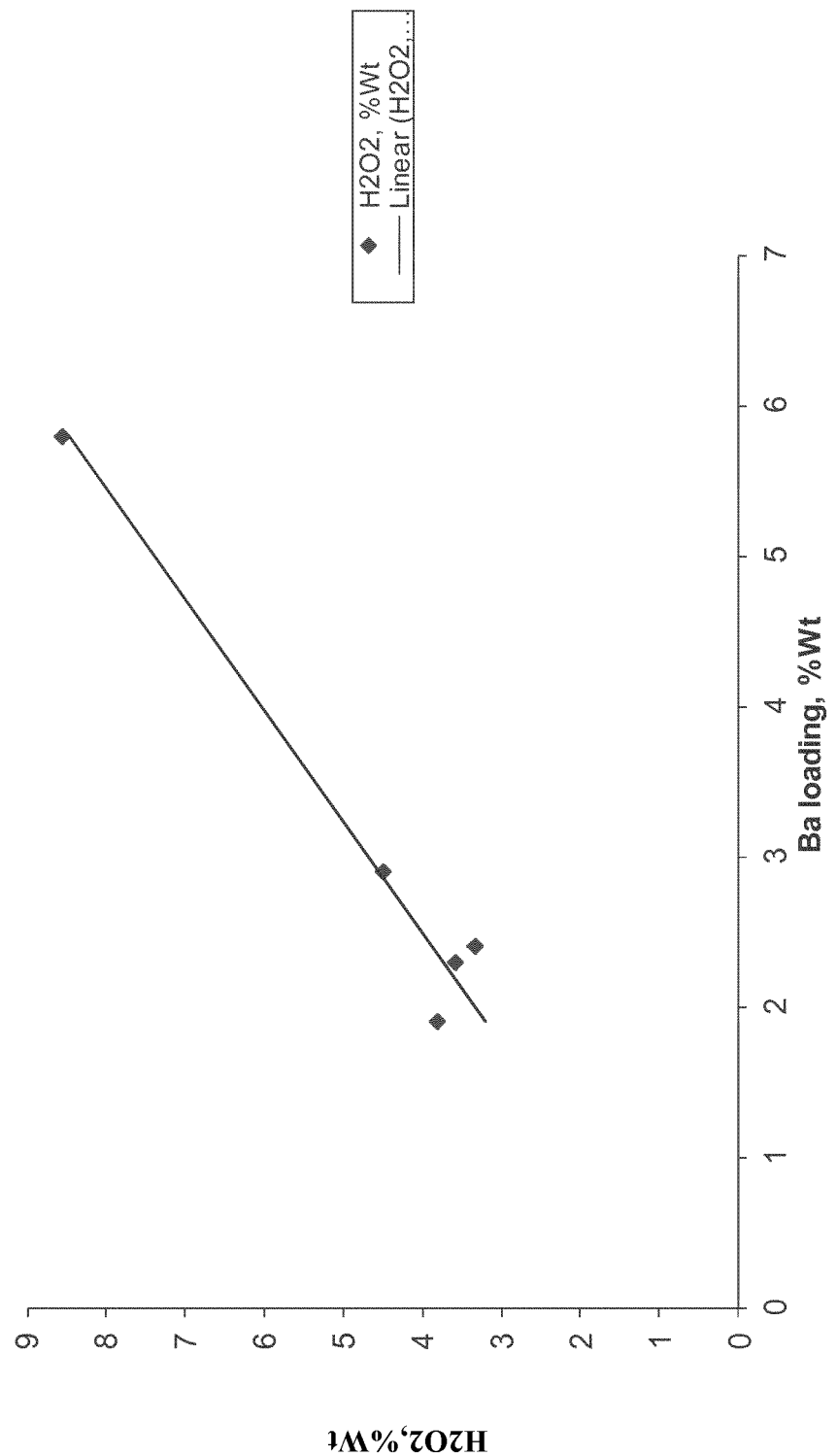

METHOD FOR THE DIRECT SYNTHESIS OF HYDROGEN PEROXIDE

This application is a U.S. national stage entry under 35 U.S.C. §371 of International Application No. PCT/EP2013/072020, filed Oct. 22, 2013, which claims priority to European patent application No. 12191401.4, filed on Nov. 6, 2012, the whole content of each of these applications is hereby incorporated herein by reference for all purposes.

The present invention relates to a method for the direct synthesis of hydrogen peroxide using a catalyst comprising at least one catalytically active metal.

Hydrogen peroxide is a highly important commercial product widely used as a bleaching agent in the textile or paper manufacturing industry, a disinfecting agent and basic product in the chemical industry and in the peroxide compound production reactions (sodium perborate, sodium percarbonate, metallic peroxides or percarboxyl acids), oxidation (amine oxide manufacture), epoxidation and hydroxylation (plasticizing and stabilizing agent manufacture). Commercially, the most common method to produce hydrogen peroxide is the Auto Oxidation (AO) process. In this process, hydrogen and oxygen react to form hydrogen peroxide by the alternate oxidation and reduction of alkylated anthraquinones in organic solvents. A significant disadvantage of this process is that it is costly and produces a significant amount of by-products that must be removed from the process.

One highly attractive alternative to the Auto Oxidation (AO) process (because it can be called a "green" process) is the production of hydrogen peroxide directly by reacting hydrogen and oxygen in the presence of metal catalysts supported on various oxides such as silica as a catalyst carrier.

However, in these processes, when a catalyst based on silica as carrier is used for the direct synthesis of hydrogen peroxide, the reaction product, i.e., hydrogen peroxide was not efficiently produced since the production of water as a by-product was very high and even higher than the hydrogen peroxide production after a certain period of time.

The use of barium sulfate as support for the direct synthesis of hydrogen peroxide has not been broadly studied up to now.

Solvay patent U.S. Pat. No. 5,447,706 published in 1993 describes the use for the direct synthesis of hydrogen peroxide of a catalyst based on pure palladium or on a combination of palladium with at least one other noble metal. Said metal is impregnated on a support comprising at least one compound selected from the group consisting of sulfates and phosphates of alkaline-earth metals. The alkaline-earth metal is selected from the group consisting of magnesium, calcium, strontium and barium. In a special embodiment, barium sulfate is preferred. This catalyst shows very good results in hydrogen peroxide synthesis (up to 4.8% Wt hydrogen peroxide in water). But unfortunately, studies showed that they possess bad mechanical characteristics (fine particles, less than 100 microns and sticky in presence of humidity).

Ellis and co-workers (Applied Catalysis B, 42 (2003) 203-211) summarized (in Table 1) all the examples described in the Solvay patent U.S. Pat. No. 5,447,706, without adding new data.

Hutchings and co-workers (Green Chemistry, 2008, 10, 388-394) have compared the results obtained with the catalyst described in the Solvay patent (U.S. Pat. No. 5,447,706) with other catalysts (Pd on titania, Pd/Au on titania or active carbon . . . ). They confirmed the good results described in the Solvay patent and concluded that the conditions described in the Solvay patent are well-adapted to monometallic supported Pd catalysts.

Although the above catalysts having barium sulfate as support show good results in the direct synthesis (DS) of hydrogen peroxide, studies have proved that said catalysts were fragile and have a very high attrition. Another important drawback was the use a large amount of inorganic acid like o-phosphoric acid for example, to maintain the pH between 0 and 4. In the examples of the Solvay patent, the classical H3PO4 concentration used is 1.6M which means extended cost and possible corrosion problems.

In CN1817838, barium sulfate is described as support for catalysts used in hydrogen peroxide production with anthraquinone. It is not described as catalyst for the DS of hydrogen peroxide.

The present invention aims at providing further catalysts, in particular catalysts suitable for the industrial preparation of hydrogen peroxide preferably by direct synthesis, which do not exhibit the above drawbacks, in particular which show a better mechanical resistance and which allow to reduce the amount of inorganic acid required for the DS of hydrogen peroxide at high concentration.

To that end, the present invention relates to a catalyst comprising at least one catalytically active metal selected from elements in Groups 7 to 11, wherein the catalytically active metal is supported on a carrier comprising at least one compound selected from the group consisting of sulfates and phosphates of alkaline-earth metals, and wherein said compound is precipitated on the carrier. More particularly, the invention relates to a method for the direct synthesis of hydrogen peroxide which uses such a catalyst.

The catalytically active metal which may be used in the catalyst of the present invention can be selected by a person skilled in the art according to the intended use of the catalyst. In one preferred embodiment of the present invention, the catalyst comprises at least one metal selected from among the platinum group comprised of ruthenium, rhodium, palladium, osmium, iridium, platinum, or any combination of these metals. In a more preferred embodiment, the catalyst comprises palladium or a combination of palladium with another metal (for example, platinum or gold).

The amount of catalytically active metal supported on the carrier can vary in a broad range, but is preferably comprised from 0.001 to 10 wt. %, more preferably from 0.1 to 5 wt. % and most preferably from 0.4 to 3 wt. %, each based on the total weight of the carrier.

In the catalyst according to the invention, the catalytically active metal is preferably present at least partly in reduced form. In the context of that embodiment of the present invention, a metal in reduced form means metal atoms having the oxidization level 0 or lower, such as $Pd^0$ or Pd hydride.

Any suitable support material can be used as carrier in the catalyst according to the invention. For example, the support material can be an inorganic or organic material. As inorganic materials, inorganic oxides can be used. For example, the inorganic oxide can be selected from elements in Groups 2 to 14, such as $SiO_2$, $Al_2O_3$, zeolites, $B_2O_3$, $GeO_2$, $Ga_2O_3$, $ZrO_2$, $TiO_2$, MgO, and mixtures thereof. The preferred inorganic oxide is $SiO_2$.

In one embodiment, the support material used in the invention has a large specific surface area of for example above 20 $m^2/g$ calculated by the BET method, preferably greater than 100 $m^2/g$. The pore volume of the support material can be for example in the range 0.1 to 3 ml/g. Typically, the mean particle size of the support ranges from 50 µm to a few mm, preferably from 60 to 210 µm for slurry catalysts. In the case of fix bed catalysts, the particle size ranges preferably from 500 µm to 5 mm.

The support materials used can essentially be amorphous like silica gel or can be comprised of an orderly structure of mesopores, such as MCM-41, MCM-48, SBA-15, or a crystalline structure, like a zeolite.

Alternatively the support material can be an organic material, such as an organic resin or active carbon. As organic resin, any known ion exchange resin can be exemplified. Suitable resins can, for example, be polystyrene resins. As active carbon, carbon nanotubes, graphite or carbon black can be used.

According to the invention, at least one compound chosen from the sulfates or the phosphates of alkaline-earth metals, or a mixture thereof, is precipitated on the carrier. Sulfate or phosphate is intended to designate an alkaline-earth metal salt which contains the neutral sulfate ($SO_4^{2-}$), monohydrogensulfate or acidic sulfate ($HSO_4^-$), neutral orthophosphate ($PO_4^{3-}$), monohydrogenorthophosphate ($HPO_4^{2-}$) or dihydrogenorthophosphate ($H_2PO_4^-$) group. All alkaline-earth metals are suitable as long as their sulfate and/or phosphate is insoluble in aqueous or alcoholic (ethanol, methanol) solution and, preferably, in acidic solutions. It is advantageous for the alkaline-earth metal to be chosen from magnesium, calcium, strontium and barium. The neutral sulfate of barium ($BaSO_4$) is particularly preferred because of its low solubility in the above mentioned solutions. Generally, barium sulfate forms an inhomogeneous coating (like stain or plates) on the support particle, which reaches a thickness of 10 to 20 µm typically.

The barium content of the catalyst according to the above preferred embodiment, measured by ICP-OES (Inductively Coupled Plasma Optical Emission Spectrometry), is preferably higher than 3% wt, more preferably higher than 5% wt. (with respect to the total weight of the catalyst) for having good selectivity and productivity at the same time.

The invention also relates to catalysts as described above wherein the catalytically active metal is palladium or the combination of palladium with another metal, the inorganic oxide is $SiO_2$, and the alkaline-earth metal compound is barium sulfate. It also relates to the use of such catalysts for the direct synthesis of hydrogen peroxide.

The present invention furthermore relates to a method for preparing the above described catalyst.

In a first embodiment of this method, in a first step, at least one sulfate or phosphate of an alkaline-earth metal is precipitated on the carrier (as defined above and with the same preferred embodiments), and in a second step, a catalytically active metal selected from elements of Groups 7 to 11 is deposited.

Preferably, solutions of halides (preferably chlorides) of the alkaline-earth metal (preferably barium) and of the catalytically active metal (preferably palladium) are used respectively in the first and the second step of the method of the invention, and preferably as aqueous solutions. Preferably, phosphoric acid or sulfuric acid is used in combination with the alkaline-earth metal halide in order to precipitate the sulfate or phosphate. For instance, barium sulfate is preferably generated by combining solutions of barium ions and sulfate ions (salts or acids). In practice, mixing a barium salt solution with sulfuric acid gives good results. Preferably, the barium salt is a halide. Barium chloride gives good results and is easily available commercially.

The deposition of the catalytically active metal onto the carrier can be performed using any of the known preparation techniques for supported metal catalyst, e.g. impregnation, adsorption, ionic exchange, etc. For the impregnation, it is possible to use any kind of inorganic or organic salt of the metal to be impregnated that is soluble in the solvent used. Suitable salts are, for example, halides such as chloride, acetate, nitrate, oxalate, etc. For example, the metal can be deposited by dipping the carrier in a solution of metal halides followed by reduction. Generally, the catalysts of the invention do not require calcination to be effective, which is advantageous from an energetic point of view.

In a preferred embodiment of the invention, silica is first contacted with sulfuric acid and with a solution of barium chloride, and then, contacted with a solution of palladium chloride.

After the metal has been deposited on the support material, the product is recovered, for example by filtration, washed and dried. Subsequently, the metal deposited on the support is preferably (at least partially) reduced, for example by using hydrogen at high temperature. This hydrogenation step can be carried out for example at a temperature from 100° C. to 300°, preferably from 120° C. to 200° C. for 1 to 10 hours, preferably for 2 to 6 hours.

In a second embodiment, the catalyst according to the invention may be synthesized by a sol-gel method, by co-precipitating a precursor of the carrier (for instance TEOS or tetraethyl orthosilicate which is a precursor of SiO2) with a halide (preferably chloride) of the alkaline-earth metal (preferably barium), preferably under an acidic pH.

The catalysts according to the invention are suitable for catalyzing various reactions, including for example hydrogenation or cyclization reactions. Preferably the catalyst is used for catalyzing the synthesis of hydrogen peroxide, either by the AO route or by DS, in particular for catalyzing the DS of hydrogen peroxide.

Hence, in another aspect, the invention is also directed to the use of the catalyst according to the invention in production of hydrogen peroxide. In the process of the invention, hydrogen and oxygen (as purified oxygen or air) are reacted continuously over a catalyst in the presence of a liquid solvent in a reactor to generate a liquid solution of hydrogen peroxide. The catalyst is used for the direct synthesis of hydrogen peroxide in a three-phase system: the catalyst (solid) is put in a solvent (water or alcohol like methanol) and the gases ($H_2$, $O_2$ and an inert gas) are bubbled in the suspension in presence of stabilizing additives (halides and/or inorganic acid: see below).

The above DS process for producing hydrogen peroxide may comprise reacting hydrogen and oxygen in the presence of the catalyst according to the invention in a reactor. The process of this invention can be carried out in continuous, semi-continuous or discontinuous mode, by the conventional methods, for example, in a stirred tank reactor with the catalyst particles in suspension, a basket-type stirred tank reactor, a fixed-bed reactor, etc. Once the reaction has reached the desired conversion levels, the catalyst can be separated by different known processes, such as filtration if the catalyst in suspension is used, which would afford the possibility of its subsequent reuse. In the case of the stirred tank reactor, the amount of catalyst used is that necessary to obtain a concentration of 0.01 to 10 wt. % catalyst (regarding the total weight of solvent and catalyst) and preferably 0.02 to 5 wt. %. The concentration of the obtained hydrogen peroxide according to the invention is generally higher than 2 wt. %, preferably higher than 4 wt. %, most preferably higher than 7 wt. %.

In addition to their catalytic properties for the reaction of direct synthesis of the hydrogen peroxide, the catalysts of the invention are unfortunately also over-hydrogenation and decomposition catalysts of the peroxide formed. It is consequently advantageous for the liquid phase in which the synthesis is carried out, to contain a compound capable of selectively poison the hydrogen peroxide decomposition and over-hydrogenation sites present on the surface of the catalyst. Halide ions are good representatives of these compounds. Their optimum concentration must be determined by means of laboratory tests within the capability of the person skilled in the art. This concentration must be sufficient in order to achieve poisoning the majority of the decomposition sites of the catalyst and, at the same time, not too high in order to avoid as much as possible the oxidation reaction of the halide ion by the hydrogen peroxide. Chloride, bromide and iodide ions are suitable to inhibit the decomposition sites of the catalyst. The bromide ion has given the best results, especially when present in a concentration between 0.05 and 3 mmol/l of liquid phase and, preferably, between 0.1 and 2 mmol/l.

It is also advantageous for the liquid phase to contain in addition an acid with the aim of inhibiting spontaneous non-catalytic decomposition of the hydrogen peroxide. However, when the acid concentration is too high, the solubility of the gases in the liquid phase decreases and the acid can react with the hydrogen peroxide present. As suitable acids, mention may be made of sulfuric acid, nitric acid and orthophosphoric acid. Orthophosphoric acid is preferred. However, the catalysts of the invention allow using the inorganic acid in an amount of 0.2 M/l or less, even of 0.1 M/l or less, which enables lowering the costs and corrosion problems while still providing good synthesis results.

The temperature of the reaction is normally chosen at a value of between −5 and 50° C. and, preferably, between 0 and 20° C.

The pressure chosen is greater than atmospheric pressure and is generally between 1 and 150 bar and, preferably, between 25 and 100 bar.

The invention will now be illustrated in more detail by way of the following examples which are not intended to be construed as being limiting.

EXAMPLES

Example of Catalyst Preparation

In a beaker of 1 l, 100 cc of demineralized water and 250 cc of sulfuric acid 1M have been introduced. 20 g of silica have been added. The mechanical stirrer has been started (250 rpm) and the suspension was heated at 80° C.

An aqueous solution of 1.41 g barium chloride (BaCl2) in 10 ml of demineralized water was prepared at room temperature.

With a syringe pump, the solution of BaCl2 was introduced in the solution at 80° C.

The beaker was let during 24 hours at room temperature without stirring.

The suspension was filtered under vacuum and the solid was washed with demineralized water.

The solid was dried one night at 100° C.

A solution of palladium chloride in water was prepared with the amount of Pd necessary to obtain a loading of 0.62% Wt Pd on the catalyst. The catalyst was dried at 95° C. for 24 hours. The Pd was reduced under influence of hydrogen, diluted with nitrogen, during 5 hours at 150° C.

This catalyst was called catalyst A.

Example of Catalyst Preparation

Same recipe as describe above has been used for another batch but with a Pd loading of 2%. This catalyst was called catalyst B.

Example of Catalyst Preparation

In a flask of 250 cc, 40.44 g of silica were introduced and put on a rotating dryer. It was heated at 75° C. and the pump was started for obtaining a vacuum of 230 mbars.

An aqueous solution of 2.78 g barium chloride (BaCl2) in 65 ml of demineralized water was prepared at room temperature.

The solution was introduced drop by drop in the rotating dryer, under vacuum. The water was evaporated directly and the salt of barium was precipitated on the silica.

250 cc of sulfuric acid 0.12M was introduced slowly, drop by drop directly in the flask at 75° C. and 110 mbars. The water and the HCl were evaporated directly and the barium sulfate was formed on the surface.

The support was dried during one night at 95° C., grinded and calcined during 5 h at 600° C.

A solution of palladium chloride in water was prepared with the amount of Pd necessary to obtain a loading of 2% Wt Pd on the catalyst. The catalyst was dried at 95° C. for 24 hours. The Pd was reduced under influence of hydrogen, diluted with nitrogen, during 5 hours at 150° C.

This catalyst was called catalyst C.

Characterization of Catalyst A, B & C

| | | Catalyst A | Catalyst B | Catalyst C |
| --- | --- | --- | --- | --- |
| Pd content | % Wt | 0.62% | NM | 1.80% |
| Ba content | % Wt | 5.0% | 5.8% | 3.9% |
| BET surface | m2/g | NM | 325 | NM |
| Granulometry | μm | NM | 100-200 | NM |

NB: "NM" stands for Not Measured

Counterexamples of Catalyst Preparation

A catalyst based on barium sulfate has been prepared by incipient wetness method: 1 g of a solution of palladium chloride (19.9% Wt in Pd) has been diluted in 19 g of demineralized water. The solution has been put in contact with 20 g of BaSO4. Catalyst has been dried overnight at 95° C.

Palladium was reduced under influence of a mix hydrogen/nitrogen at 150° C. during 5 hours.

This catalyst was called catalyst D.

The Pd content of this catalyst is 1.20% Wt. The BET surface is 9.7 m2/g and the granulometry is upper than 110 μm.

A catalyst based on silica has been prepared by incipient wetness method: 1 g of a solution of palladium chloride (19.9% Wt in Pd) has been diluted in 19 g of demineralized water. The solution has been put in contact with 20 g of silica. Catalyst has been dried overnight at 75° C.

Palladium was reduced under influence of a mix hydrogen/nitrogen at 125° C. during 8 hours.

Pd content has been determined by ICP-OES and reaches 0.91% Wt.

This catalyst was called catalyst E.

Catalyst E has a surface area determined by BET of 316 m2/g and is amorphous (DX). The diameter of the particles determined by SEM is around 200 microns.

Examples of Catalyst Preparation

Several catalysts have been prepared following the recipe described for the catalyst A. The Pd loading attended is 2% Wt in each case. They were called catalysts F, G, H and I. Characterization of Catalyst D to I

|  |  | Catalyst D | Catalyst F | Catalyst G | Catalyst H | Catalyst I |
|---|---|---|---|---|---|---|
| Pd content | % Wt | 2.0% | NM | NM | NM | NM |
| Ba content | % Wt | NM | 2.3% | 2.4% | 1.9% | 2.9% |
| BET surface | m2/g | 9.7 | NM | NM | NM | NM |
| Granulometry | μm | 3.7 | NM | NM | NM | NM |

Direct Synthesis of Hydrogen Peroxide

In a HC276 380 cc reactor, methanol (220 g), Hydrogen bromide (58 ppm), ortho-phosphoric acid (H3PO4) and catalyst (1.80 g) were introduced. The amount of o-phosphoric acid was calculated to obtain a final concentration of 0.1M.

The reactor was cooled to 5° C. and the working pressure was at 50 bars (obtained by introduction of nitrogen).

The reactor was flushed all the time of the reaction with the mix of gases: Hydrogen/Oxygen/Nitrogen. The total flow was 3975 mlN/min When the gas phase out was stable (GC on line), the mechanical stirrer was started at 1200 rpm.

GC on line analyzes every 10 minutes the gas phase out.

Liquid samples were taken to measure hydrogen peroxide and water concentration.

Hydrogen peroxide was measured by redox titration with cerium sulfate.

Water was measured by Karl-Fisher titration.

Attrition Test

The following usual laboratory equipment was used:

Sieve shaking machine, for instance: Rotap-International Combustion Ltd, Derby, UK.

Test sieves: 200 mm diameter, aperture sizes 106 μm and 63 μm, complying with ISO 565.

Balance capable to weigh to ±0.1 g.

Attrition apparatus: a glass tube equipped with a P4 filter at the bottom.

Gas goes through the filter and fluidized the solid.

25 mm diameter glass tubing with associated gaskets and flanges

Soxhlet thimbles, 25 mm diameter

Orifice plate stainless steel, with a 0.4 mm hole drilled centrally (drill the plate to match the flanges)

Flow meter, graduated in liters per minute.

The following recipe was used:

Place about 30 g of support on the 106 μm sieve. Place the sieves on the shaking device and sieve for 10 minutes. Weigh 25.0 g of catalyst retained on the 106 μm sieve.

Transfer 25.0 g of catalyst to the attrition apparatus. Place the dust collector (Soxhlet thimble) on the top of the glass tube and set ON the timer button to allow the air to pass into the attrition tube for 30 minutes.

When the apparatus was stopped, set OFF the timer button.

Transfer quantitatively the contents of the attrition tube and dust collector into the nest of sieves for 10 minutes. Weigh the contents of each sieve and the base pan. Let the weight of the sample which has a size smaller than 63 μm be W1. Let the total weight of all sieves be WP.

Attrition, $\% = W1/WP \times 100$

Examples No. 1 & 2 of Hydrogen Peroxide Direct Synthesis

High Amount of $H_3PO_4$

|  |  | Catalyst A | Catalyst B |
|---|---|---|---|
| Methanol | g | 220.26 | 220.01 |
| HBr | ppm | 57.7 | 57.7 |
| $H_3PO_4$ | M | 1.6 | 1.6 |
| Catalyst | g | 1.7843 | 1.8012 |
| Temperature | ° C. | 5 | 5 |
| Pressure | bar | 50 | 50 |
| Hydrogen | % Mol | 3.3 | 3.3 |
| Oxygen | % Mol | 68.1 | 68.1 |
| Nitrogen | % mol | 28.5 | 28.5 |
| Total flow | mlN/min | 3155 | 3155 |
| Speed | rpm | 1200 | 1200 |
| Contact time | Min | 240 | 300 |
| Hydrogen peroxide fin | % Wt | 4.06 | 3.26 |
| Water fin | % Wt | 4.13 | 0.45 |
| Conversion fin | % | 35.7 | 18.1 |
| Selectivity fin | % | 69.0 | 79.0 |
| Productivity fin | mol $H_2O_2$/(kg of Pd*h) | 5999 | 1179 |

These results show that a better selectivity but a lower productivity is obtained when switching from 0.62 to 2% wt Pd loading.

Examples No. 3 & 4 of Hydrogen Peroxide Direct Synthesis

Lower Amount of $H_3PO_4$ and Influence of the H2/O2 Ratio

Catalyst B was used in both examples, with a different H2/O2 ratio

|  |  | Catalyst B | Catalyst B |
|---|---|---|---|
| Methanol | g | 220.35 | 221.10 |
| HBr | ppm | 57.7 | 57.7 |
| $H_3PO_4$ | M | 0.1 | 0.1 |
| Catalyst | g | 1.8003 | 1.8010 |
| Temperature | ° C. | 5 | 5 |
| Pressure | bar | 50 | 50 |
| Hydrogen | % Mol | 3.3 | 3.6 |
| Oxygen | % Mol | 68.1 | 55.0 |
| Nitrogen | % mol | 28.5 | 41.4 |
| Total flow | mlN/min | 3155 | 3975 |
| Speed | rpm | 1200 | 1200 |
| Contact time | Min | 240 | 240 |
| Hydrogen peroxide fin | % Wt | 6.33 | 8.56 |
| Water fin | % Wt | 3.40 | 4.75 |
| Conversion fin | % | 57.5 | 36.9 |
| Selectivity fin | % | 52 | 51 |
| Productivity fin | mol $H_2O_2$/(kg of Pd*h) | 2873 | 3895 |

Example 5 and Counterexamples No. 1 & 2

Comparison with a Catalyst Based on Silica or Barium Sulfate

| Catalyst B, Catalyst D & Catalyst E | | | | |
|---|---|---|---|---|
| | | Catalyst B | Catalyst D | Catalyst E |
| Methanol | g | 221.10 | 220.11 | 150.49 |
| HBr | ppm | 57.7 | 57.8 | 51 |
| $H_3PO_4$ | M | 0.1 | 1.6 | 0 |
| Catalyst | g | 1.8010 | 0.9186 | 2.6675 |
| Temperature | °C. | 5 | 25 | 5 |
| Pressure | bar | 50 | 50 | 50 |
| Hydrogen | % Mol | 3.6 | 3.3 | 3.51 |
| Oxygen | % Mol | 55.0 | 68.1 | 35.06 |
| Nitrogen | % mol | 41.4 | 28.5 | 61.43 |
| Total flow | mlN/min | 3975 | 3155 | 2567 |
| Speed | rpm | 1200 | 1200 | 1500 |
| Contact time | Min | 240 | 240 | 225 |
| Hydrogen peroxide fin | % Wt | 8.56 | 5.06 | 2.48 |
| Water fin | % Wt | 4.75 | 4.11 | 5.31 |
| Conversion fin | % | 36.9 | 47.1 | 46.0 |
| Selectivity fin | % | 51 | 74 | 19.9 |
| Productivity fin | mol $H_2O_2$/(kg of Pd*h) | 3895 | 7350 | 1207 |

As can be see, Catalyst D gives the better results in terms of selectivity and productivity but it requires a high $H_3PO_4$ content (1.6M) with the associated corrosion problems; and it gives bad results in attrition (see below).

Counterexample 3

Catalyst D Based on BaSO4 Alone and Used with 0.1 M $H_3PO_4$

| | | Catalyst D |
|---|---|---|
| Methanol | g | 219.99 |
| HBr | ppm | 35 |
| $H_3PO_4$ | M | 0.1 |
| Catalyst | g | 0.8181 |
| Temperature | °C. | 25 |
| Pressure | bar | 50 |
| Hydrogen | % Mol | 3.6 |
| Oxygen | % Mol | 55 |
| Nitrogen | % mol | 41.4 |
| Total flow | mlN/min | 3975 |
| Speed | rpm | 1200 |
| Contact time | Min | 180 |
| Hydrogen peroxide fin | % Wt | 0.64 |
| Water fin | % Wt | 2.19 |
| Conversion fin | % | 11.2 |
| Selectivity fin | % | 15 |
| Productivity fin | mol $H_2O_2$/(kg of Pd*h) | 1247 |

This counterexample shows indeed the bad results obtained when lowering the $H_3PO_4$ content with Catalyst D.

Examples No. 6 to 9

Comparison with Different Ba Loading

Catalysts F to I

| | | Catalyst F | Catalyst G | Catalyst H | Catalyst I |
|---|---|---|---|---|---|
| Methanol | g | 220.39 | 221.34 | 220.41 | 223.42 |
| HBr | ppm | 57.7 | 57.7 | 57.7 | 57.7 |
| $H_3PO_4$ | M | 0.1 | 0.1 | 0.1 | 0.1 |
| Catalyst | g | 1.8000 | 1.8016 | 1.8008 | 1.8006 |
| Temperature | °C. | 5 | 5 | 5 | 5 |
| Pressure | bar | 50 | 50 | 50 | 50 |
| Hydrogen | % Mol | 3.6 | 3.6 | 3.6 | 3.6 |
| Oxygen | % Mol | 55.0 | 55.0 | 55.0 | 55.0 |
| Nitrogen | % mol | 41.4 | 41.4 | 41.4 | 41.4 |
| Total flow | mlN/min | 3975 | 3975 | 3975 | 3975 |
| Speed | rpm | 1200 | 1200 | 1200 | 1200 |
| Contact time | Min | 240 | 240 | 240 | 240 |
| Hydrogen peroxide fin | % Wt | 3.58 | 3.34 | 3.81 | 4.50 |
| Water fin | % Wt | 2.76 | 2.19 | 2.73 | 2.21 |
| Conversion fin | % | 19.0 | 6.2 | 20.1 | 21.3 |
| Selectivity fin | % | 43 | 46 | 43 | 53 |
| Productivity fin | mol $H_2O_2$/(kg of Pd*h) | 1627 | 1519 | 1727 | 2068 |

SEM analysis of catalyst H shows a better barium repartition on the SiO2 particles.

In fact, Ba loadings below 3% wt give a rather high experimental error: see FIG. 1 attached, which represents graphically for examples 3 and 6 to 9, the evolution of the final H2O2 concentration in function of the Ba loading.

This is why in a preferred embodiment of the invention, the barium content of the catalyst, measured by ICP-OES, is higher than 3% wt, more preferably higher than 5% wt.

Example of Attrition

| | Attrition, % Wt |
|---|---|
| Catalyst C | 3.2% |
| Catalyst E | 3.1% |
| Catalyst D | 6% |

The value of the attrition given for catalyst D is an approximation because the product was sticky and difficult to handle.

Should the disclosure of any patents, patent applications, and publications which are incorporated herein by reference conflict with the description of the present application to the extent that it may render a term unclear, the present description shall take precedence.

The invention claimed is:

1. A method for the direct synthesis of hydrogen peroxide, comprising reacting hydrogen and oxygen in the presence of a catalyst comprising at least one catalytically active metal selected from elements in Groups 7 to 11, wherein the catalytically active metal is supported on a carrier comprising precipitated barium sulfate, wherein the carrier further comprises $SiO_2$ and wherein the barium content of the catalyst, measured by ICP-OES is higher than 3% wt.

2. The method according to claim 1, wherein the catalytically active metal is selected from palladium, platinum, silver, gold, rhodium, iridium, ruthenium, osmium, and combinations thereof.

3. The method according to claim 2, wherein the catalytically active metal is palladium or the combination of palladium with another metal.

4. The method according to claim 1, wherein the catalytically active metal is present at least partly in reduced form.

5. The method according to claim 1, wherein the barium content of the catalyst, measured by ICP-OES, is higher than 5% wt.

6. The method according to claim 1, wherein the catalyst has been prepared by a method wherein in a first step, barium sulfate is precipitated on a $SiO_2$ support material to form the carrier and in a second step, the catalytically active metal is deposited on said carrier.

7. The method according to claim 6, wherein solutions of halides of the alkaline-earth metal and of the catalytically active metal are used respectively in the first and in the second step.

8. The method according to claim 6, wherein after the metal has been deposited on the support material, the product is recovered, washed and dried and subsequently, the metal deposited on the support is at least partially reduced.

9. The method according to claim 1, wherein the synthesis is carried out in a liquid phase containing halide ions.

10. The method according to claim 9, wherein the liquid phase further comprises an acid chosen from sulfuric acid, nitric acid and orthophosphoric acid.

11. The method according to claim 10, wherein the acid comprises orthophosphoric acid.

12. The method according to claim 9, wherein the synthesis is carried out in a liquid phase containing bromide ions.

13. The method according to claim 1, wherein the catalytically active metal is palladium or the combination of palladium with another metal.

14. The method according to claim 1, wherein the carrier consists essentially of $SiO_2$ with a precipitated layer of barium sulfate thereon.

* * * * *